US008494544B2

(12) United States Patent
Patoskie et al.

(10) Patent No.: US 8,494,544 B2
(45) Date of Patent: Jul. 23, 2013

(54) METHOD, APPARATUS AND COMPUTER PROGRAM TO PERFORM LOCATION SPECIFIC INFORMATION RETRIEVAL USING A GESTURE-CONTROLLED HANDHELD MOBILE DEVICE

(75) Inventors: John Patoskie, Allen, TX (US); Mark Gerard, Plano, TX (US); Thomas Wheeler, Frisco, TX (US)

(73) Assignee: Osocad Remote Limited Liability Company, Wilmington, DE (US)

( * ) Notice: Subject to any disclaimer, the term of this patent is extended or adjusted under 35 U.S.C. 154(b) by 586 days.

(21) Appl. No.: 12/629,927

(22) Filed: Dec. 3, 2009

(65) Prior Publication Data

US 2011/0136511 A1   Jun. 9, 2011

(51) Int. Cl.
*H04W 72/00* (2009.01)

(52) U.S. Cl.
USPC ......... 455/453; 455/566; 455/563; 455/414.1

(58) Field of Classification Search
USPC ............... 455/453, 566, 563, 414.1; 345/419, 345/173; 715/707, 726
See application file for complete search history.

(56) References Cited

U.S. PATENT DOCUMENTS

| | | | |
|---|---|---|---|
| 4,214,485 A | 7/1980 | Berger et al. |
| 5,128,655 A | 7/1992 | Shore |
| 5,602,566 A | 2/1997 | Motosyuku |
| 5,797,105 A | 8/1998 | Nakaya et al. |
| 6,025,830 A | 2/2000 | Cohen |
| 6,112,141 A | 8/2000 | Briffe et al. |
| 6,201,544 B1 | 3/2001 | Ezaki |
| 6,201,554 B1 | 3/2001 | Lands |
| 6,242,743 B1 | 6/2001 | DeVito et al. |
| 6,300,933 B1 | 10/2001 | Nagasaki |
| 6,347,290 B1 | 2/2002 | Bartlett |
| 6,357,939 B1 | 3/2002 | Baron |
| 6,369,794 B1 | 4/2002 | Sakurai et al. |
| 6,375,572 B1 | 4/2002 | Masuyama |

(Continued)

FOREIGN PATENT DOCUMENTS

| | | |
|---|---|---|
| JP | 9081305 | 3/1997 |
| WO | 1995/07526 | 3/1995 |

(Continued)

OTHER PUBLICATIONS

Analog Devices; Analog Devices Introduces the World's Smallest and Least Expensive Micromachined Tilt/Motion Sensor, PR Newswire, Jun. 12, 2000.

(Continued)

*Primary Examiner* — Manpreet Matharu
(74) *Attorney, Agent, or Firm* — Stolowitz Ford Cowger LLP

(57) ABSTRACT

A method and apparatus are disclosed that calculate an area-of-interest based on a user request for location specific data. The operations may include transmitting initial location data of the mobile terminal and user initiated gesture data to a server. The server may then perform initiating a request to receive the requested location data, and calculating a geographical area-of-interest based on the initial location data and the user initiated gesture data. The location specific data related to the area-of-interest may then be retrieved and transmitted to the mobile terminal. The area-of-interest may be defined based on the initial position of the mobile terminal and information provided by a gesture made by the user of the mobile terminal.

24 Claims, 5 Drawing Sheets

U.S. PATENT DOCUMENTS

| | | |
|---|---|---|
| 6,385,351 B1 | 5/2002 | Simske et al. |
| 6,396,497 B1 | 5/2002 | Reichlen |
| 6,411,275 B1 | 6/2002 | Hedberg |
| 6,442,479 B1 | 8/2002 | Barton |
| 6,466,198 B1 | 10/2002 | Feinstein |
| 6,567,101 B1 | 5/2003 | Thomas |
| 6,621,928 B1 | 9/2003 | Inagaki et al. |
| 6,690,358 B2 | 2/2004 | Kaplan |
| 6,834,249 B2 | 12/2004 | Orchard |
| 7,184,020 B2 | 2/2007 | Matsui |
| 7,271,795 B2 | 9/2007 | Bradski |
| 7,679,604 B2 | 3/2010 | Uhlik |
| 8,018,435 B2 | 9/2011 | Orchard |
| RE43,587 E | 8/2012 | Orchard |
| 2004/0169636 A1 | 9/2004 | Park et al. |
| 2006/0125782 A1 | 6/2006 | Orchard et al. |
| 2006/0161379 A1* | 7/2006 | Ellenby et al. .............. 702/150 |
| 2007/0139373 A1 | 6/2007 | Simon |
| 2010/0141579 A1 | 6/2010 | Orchard et al. |

FOREIGN PATENT DOCUMENTS

| | | |
|---|---|---|
| WO | WO9814863 | 4/1998 |
| WO | WO9918495 | 4/1999 |
| WO | WO9932960 | 7/1999 |
| WO | 2007/132055 | 11/2007 |
| WO | WO2007132055 | * 11/2007 |
| WO | 2009/104088 | 8/2009 |
| WO | 2011068622 | 6/2011 |

OTHER PUBLICATIONS

David Small et al.; Design of Spatially Aware Graspable Displays,; CHI '97 extended abstracts on Human factors in computing systems, Mar. 1997, pp. 367-368.

Vesa-Matti Mantyla et al.; Hand gesture recognition of a mobile device user, IEEE International Conference on Multimedia and Expo, vol. 1, 2000, pp. 281-284.

C. Verplaetse; Inertial proprioceptive devices: Self-motion-sensing toys and tools, IBM Systems Journal, vol. 35, Nos. 3 & 4, 1996, pp. 639-650.

Analog Devices Inc.; MEMS sets new portable apps in motion, Electronic Engineering Times, Jun. 19, 2000, p. 162.

Ashok Bindra; Miniature MEMS Accelerometer Adds Motion Sensing To Consumer Products, Electronic Design, vol. 48, No. 13, Jun. 2000, p. 45.

Joel Bartlett; Rock 'n' Scroll is here to stay, IEEE Computer Graphics and Applications, vol. 20, No. 3, May 2000, pp. 40-45.

Ken Hinckley et al.; Sensing Techniques for Mobile Interaction, Proceedings of the 13th annual ACM symposium on User interface software and technology, 2000, pp. 91-100.

George Fitzmaurice; Situated Information Spaces and Spatially Aware Palmtop Computers, Communications of the ACM, vol. 36, No. 7, Jul. 1993, pp. 39-49.

Beverly Harrison et al.; Squeeze Me, Hold Me, Tilt Me! An Exploration of Manipulative User Interfaces, Proceedings of the SIGCHI conference on Human factors in computing systems, 1998, pp. 17-24.

George Fitzmaurice et al.; The Chameleon: Spatially Aware Palmtop Computers, Conference companion on Human factors in computing systems, 1994, pp. 451-452.

Jun Rekimoto; Tilting Operations for Small Screen Interfaces, Proceedings of the 9th annual ACM symposium on User interface software and technology, 1996, pp. 167-168.

European Patent Office, International Searching Authority; PCT/US2010/055585; International Search Report and Written Opinion; Mar. 7, 2011; 12 Pages.

European Patent Office; IB International Preliminary Report on Patentability and Written Opinion of the ISA, PCT/US2010/055585; Jun. 14, 2012; 15 Pages.

* cited by examiner

METHOD, APPARATUS AND COMPUTER PROGRAM TO PERFORM LOCATION SPECIFIC INFORMATION RETRIEVAL USING A GESTURE-CONTROLLED HANDHELD MOBILE DEVICE

BACKGROUND OF THE INVENTION

Mobile location specific computing is made possible by the availability of small, fast and wireless hand-held processing devices equipped with location identification capabilities. Examples of location identification services may include compass-related functions (i.e., latitude and longitude based location tools) and GPS receivers with additional capabilities such as distance and time-related calculations used to arrive at a desired target location.

Mobile communications systems implement location-specific add-on features that include various different location estimation techniques, such as, E-OTD (Enhanced Observed Time Difference), FOTA (Forced Timing Advance), TA (Timing Advance), TDOA (Time Difference Of Arrival) and TOA (Time Of Arrival) etc.

Hybrid systems are also used by mobile communications systems that incorporate a conventional location method, such as, those mentioned above, and which also rely on satellite-based location systems, such as, GPS (Global Positioning System) or Galileo. These types of systems may offer more accurate location services or other advanced location features.

Broadcast cellular systems may also be combined with GPS in mobile environments to provide location-specific services to mobile stations. In such combined implementations, normally a central or distributed control site (e.g., Base Station Controller, Mobile Station Controller) determines the requested information content based on the received user request and provides the user with feedback from a database accessible via the mobile network. In this example, an auxiliary channel must be provided between the mobile user receiving device and the control center to provide the location-specific information content to the mobile user.

Broadcast cellular systems are normally only cost effective in very large service areas of hundreds of square miles. As for smaller areas, the use of such a system can hardly be justified for users with specific needs and preferences. For example, users who are limited to a smaller geographical location may have less success when trying to pinpoint a location and provide feedback location information to the network regarding their surroundings.

Currently, the techniques used for location-specific services access a computer network in order to search for a user's desired information. In these types of location service models, data may be retrieved from external data sources, processed for location-related queries and transmitted to the user's portable device. Such a combination of operations may be time consuming and load heavy on system resources. Additionally, such location service models are limited in their ability to offer user selection services. For instance, the user's preferences and involvement (i.e., defining an area of interest) during the execution of a location service application may be limited or non-existent altogether.

In addition to general conventional location services for mobile users, there are also known ways to track the movement or gestures made by a user of a wireless transmitting device. For example, a sensing device may be used for determining and measuring linear and/or arc movements of a human body by an accelerometer. Sensing and transmitting data related to movements of a human body may be accomplished by sending the data by a wireless transmitter of the user's device to other electrical peripheral devices, which enables the user to interact with those electrical peripheral devices in a multimedia fashion.

Accelerometers and other signal processing devices may track user movement and provide real-time updated user movement via an electronic transmitting device. Furthermore, the location specific needs of users of wireless terminals may be handled faster and with more detailed precision if the application servers are fully aware of the user's location between location information transfers between the user device and the application servers.

SUMMARY OF THE INVENTION

Disclosed is an optimized method and apparatus to receive location specific information from a gesture-controlled handheld mobile device and to calculate additional location information based on the user's request by taking into consideration the user's area-of-interest by including arc gesture data provided by the mobile device and the user's current location.

One example embodiment of the present inventive concept includes a method of providing requested location data to a mobile terminal. The method includes transmitting initial location data of the mobile terminal and user initiated gesture data to a server. The method also includes initiating a request to receive the requested location data. The method also includes calculating a geographical area-of-interest based on the initial location data and the user initiated gesture data. The method further includes retrieving location specific data related to the area-of-interest, and transmitting the area-of-interest and the related location specific data to the mobile terminal.

Another example embodiment of the present inventive concept may also include an apparatus configured to provide requested location data to a mobile terminal. The apparatus includes a receiver configured to receive initial location data of the mobile terminal and user initiated gesture data, and to initiate a request to receive the requested location data. The apparatus also includes a processor configured to calculate a geographical area-of-interest based on the initial location data and the user initiated gesture data, and to retrieve location specific data related to the area-of-interest. The apparatus further includes a transmitter configured to transmit the area-of-interest and the related location specific data from the mobile terminal.

DETAILED DESCRIPTION OF THE PREFERRED EMBODIMENTS

Figure 1:
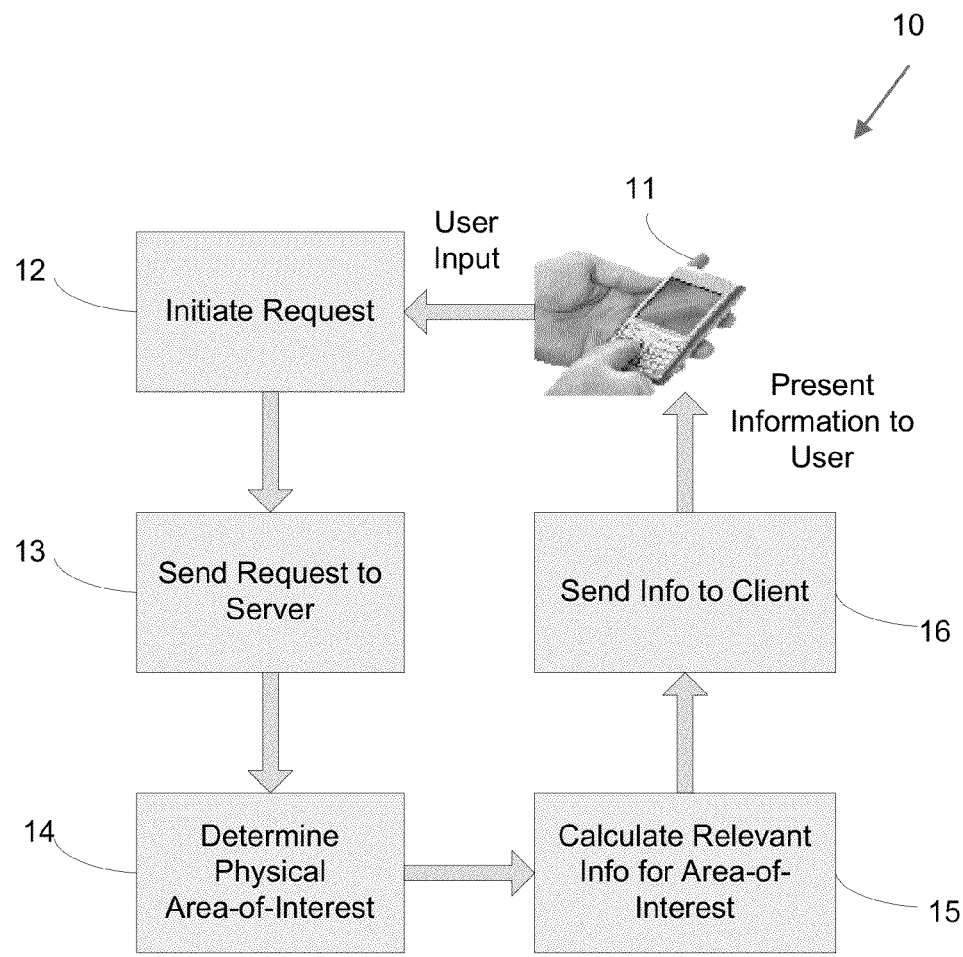
FIG. 1 illustrates a system block diagram according to an example embodiment of the present inventive concept.

FIG. 1 illustrates a system diagram 10 according to an example embodiment of the present inventive concept. Referring to FIG. 1 a user device 11, such as, a mobile terminal (MT) provides a user input at operation 12 that may be, for example, an initiated request for a location or simply user location information of the current location of the MT 11. The user request may be sent to a server at operation 13 at a local base station (BS) or to a remote server location.

Further to the operations of FIG. 1, operation provides that the request is received and a physical area-of-interest is determined for the user based on the requested information and/or the user's current location. A database (not shown) may be accessed to reference previously stored user parameters, which may provide additional input for calculating a relevant area-of-interest (i.e., a local facility, a target geographical area, etc.) at operation 15. Once the area-of-interest is calculated, the relevant information may then be sent to the client/user MT 11 at operation 16.

Figure 2:
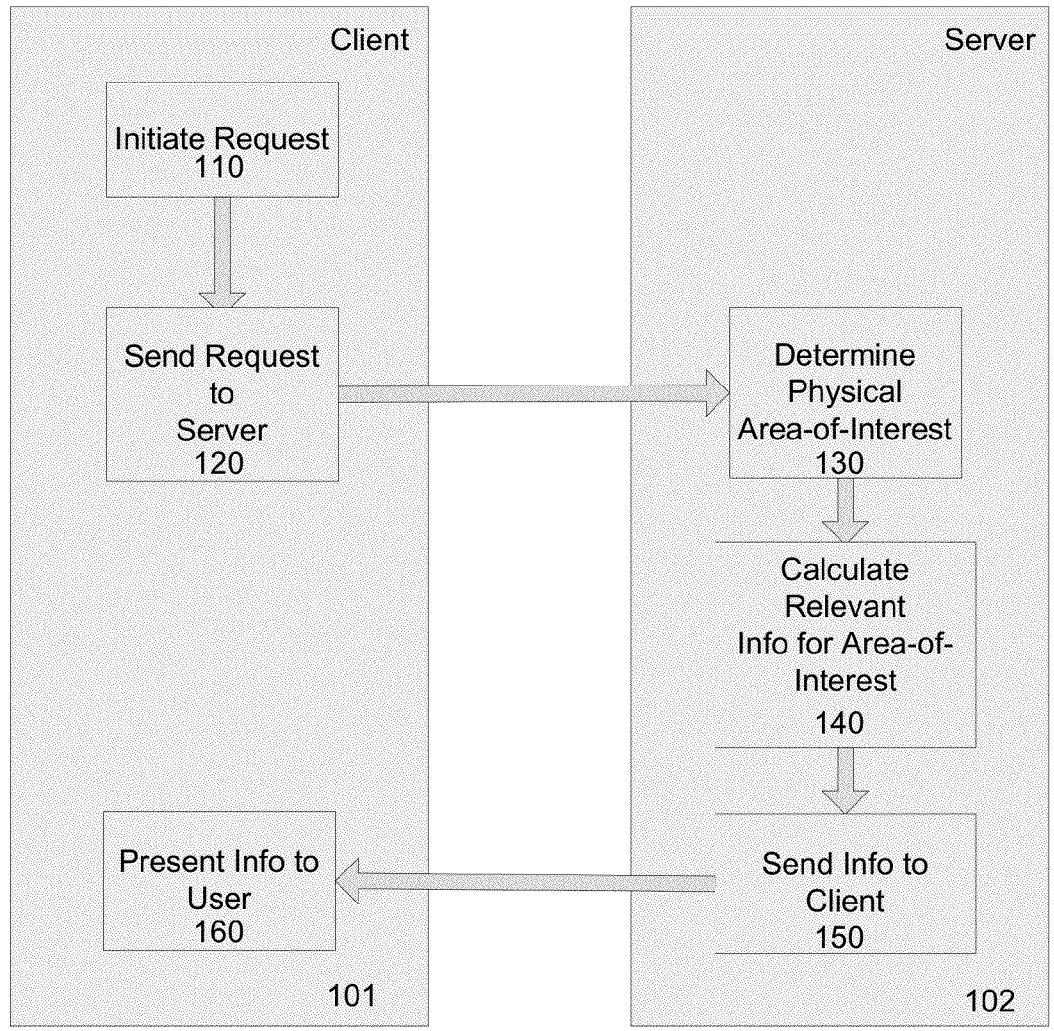
FIG. 2 illustrates a flow diagram of the client server model according to an example embodiment of the present inventive concept.

Referring to the operations of the system model in greater detail, FIG. 2 illustrates further example operations that are performed between the MT 11 and the server side of the system network. The MT 11 may instead by referred to as a client device 101 which communicates with a server device 102 at a remote location.

Referring to FIG. 2, the client device 101 may be a handheld computer or mobile terminal (MT) capable of locating its position (e.g., latitude, longitude and/or direction), via an internal and/or external compass, which may also include a GPS device. The server device 102 may be a general purpose computer capable of providing processing and database services to the client 101.

In operation, the client device 101 initiates a request 110 that is processed at operation 120 and is sent to the server 102. Once the request is received, the server 102 determines the physical area-of-interest (operation 130) based on the client's current geographical position and further based on the client's gesture and/or movement. The combination of the client's position and gesture are both taken into consideration when calculating the relevant area-of-interest information (i.e., a boundary estimate of the client's desired targeted area) at operation 140. The information provided by the server is sent to the client 101 (operation 150) and is presented to the user (operation 160).

Figure 3:
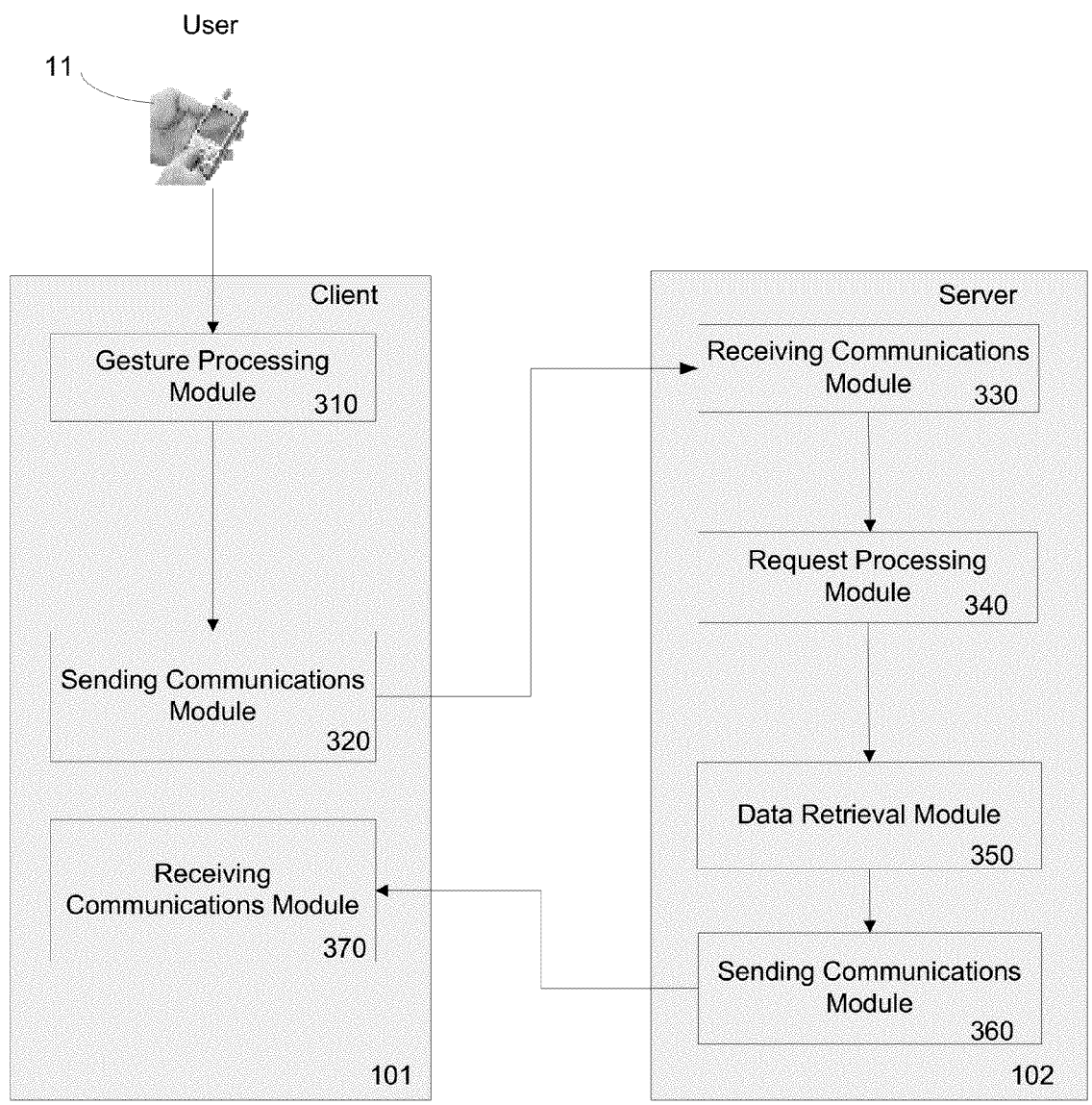
FIG. 3 illustrates another flow diagram of the hardware components of the client server model according to an example embodiment of the present inventive concept.

FIG. 3 illustrates a block diagram of the hardware components used in an example communication transfer between the client 101 and the server 102. The user device 11 illustrates an example computing device, such as, a mobile phone or hybrid personal digital assistant (PDA) and mobile phone. The client 101 represents the processing modules used in the user device 11.

The gesture processing module 310 receives the user input gesture, which may include, for example, a voice command, a movement of the user device 11, a change in direction of the user device 11, etc. The gesture processing module 310 may then forward the gesture information and the user's current position information (e.g., GPS location information) to the sending communications module 320, which then transmits the information to the server 102 via a wireless connection over a local and/or remote communications network.

The receiving communications module 330 of the server 102 receives the location and gesture related information and forwards it to the request processing module 340 which initiates a request for stored data and other resources to assist in predicting and calculating an area-of-interest. For example, the request processing module 340 will interpret the received location information and determine the coordinates and the location origin of the area-of-interest.

The server 102 further calculates the relevant information needed to determine the area-of-interest by the data retrieval module 350. The information gathered for the user may include information related to the request itself (i.e., a gas station, bank, service area) and may also include relevant advertisement data related to other services within the area-of-interest defined by the data retrieval module 350.

Once the information related to the request is obtained, the user requested data will be forwarded to the client device 101 via the sending communications module 360, and received at the client device 101 via the receiving communications module 370. The client device 101 may further process the information before presenting the requested data to the user of the client device 101. The client device 101 will receive the sent information, which will be presented to the user by the client device 101.

The information provided by the client device 101 to the server 102 will include both a location estimate of the client device 101 and gesture data. For instance, an initial GPS location position of the mobile client device 101 may be obtained via an estimate provided by a satellite. In addition, a gesture performed by the user of the client device 101 will be combined with the GPS location estimate.

The gesture portion of the data will be used to determine a target area-of-interest. For example, the movement of the client device 101 in a particular direction may be discerned as being a valid gesture which will narrow the area-of-interest to a particular direction near the original GPS calculated location of the mobile device 101 (i.e., relevant location information in the direction moved). In a two-dimensional coordinate system, the GPS estimate location of the client device 101 may be used to represent a starting point, and, the gesture (i.e., movement of the user in a particular direction) may be used to move from the point to create an arc of movement data. The arc can in turn be used to define a region or area-of-interest.

The gesture may be initiated by a command, for example, a simple push button indicating a direction arrow pointing in a direction of interest. The gesture may instead be a vocal command that indicates a direction (i.e., "north") or object that may be recognized by the server as a valid gesture that assists in defining a region or area-of-interest. For instance, the movement of the device may be interpreted as a two-dimensional arc that is tracked and stored in memory as gesture data defining the area-of-interest.

Another example of a gesture may be providing a direction in a well-defined shopping area. For instance, a user of a mobile terminal may initiate a request by conducting a gesture for information while being located in a shopping plaza. The user's current position may be located as being on the sidewalk by a GPS satellite. The user may then gesture towards a store by moving the client device in the direction of the store. This movement may constitute a valid gesture that is used with the GPS data to provide information regarding the store. As a result, the user may receive information about the store (e.g., coupons, advertising, details of merchandise etc.).

In another example, according to an example embodiment of the present inventive concept, the arc-description may be generated by a separate device (e.g. separate apparel worn by the user). For instance, a bluetooth enabled device (i.e., a pair of sunglasses) may offer another way to communicate gesture data (via the direction of the user's head) to the mobile device, which may be interpreted as a valid gesture by the server 102. A locally paired device that is capable of communicating with the mobile device may provide an alternative to offering gesture data, provided that the external device has the requisite compass (i.e., orientation) functionality.

In the case of an orientation only type of gesture, a direction of the device is used to represent a valid gesture. Such an example gesture would require a compass functionality and would offer a direction and an angle that could be measured to identify the direction the user is pointing without any arc movement being generated. In turn, the angle could then be used to provide a direction of interest, which could then be defined as a larger area-of-interest.

Providing the information to the user may be accomplished by a server or a plurality of distributed servers. The plurality of distributed servers can offer individualized treatment of the requests depending on the local information stored in each server. The information may be presented to the user via text message, push email or an executable application on the user device.

The server 102 calculations that may be performed based on device location information and user gesture information may include narrowing the area-of-interest by beginning at a single point. For example, a circle-shaped region based on a point may be narrowed by offering an angle based on the gesture information that could be used to narrow a section of the circle. The arc path generated from the user gesture information could define a pie slice of the circle as an area of interest. Translating the pie slice to a map, may offer the locations of stores or facilities wholly or partially within only the defined pie slice.

Server calculations include converting the user supplied area-of-interest (arc) and "fitting" it to a preset granularity for the categorization of information (e.g. the server may use 60 degree arcs in hexagons or circles of map data). The client 101 and server 102 may exchange client-to-server and server-to-client information. The links between client 101 and server 102 may be wireless links enabled directly or through other transport networks. The client 101 may initiate an area-of-interest request that may include an initial compass heading and gesture data.

The request which may include location, compass heading, gesture arc, and distance information, may be sent to the server 102 by the sending unit 120. The sending unit, in turn, should generally be equipped with all necessary functions and hardware required to communicate with the server 102.

More precise user preferred location information may be generated by using a combination of a predetermined location (i.e., latitude and longitude determined via GPS or other location method) and a gesture as input to an information source. In addition, a remote database of location-relevant information filtered by user preferences may offer more precise user preferred location information when compared to the predetermined location and gesture information. In addition, the area-of-interest may be determined on the client device 101 before sending the request to a server 102. The server 102 could further modify the area-of-interest or simply just populate the area-of-interest with facility information of nearby stores, gas stations or other user preferred facility information.

The user's request for information pertaining to a particular area-of-interest may provide optimized use of the system resources, such as, bandwidth and network resources. For instance, by pre-storing user preferences and receiving user initiated area-of-interest information, the system may offer fast and optimized location information to the user without requiring excessive bandwidth requirements or processing resources. There may also be a reduction in the overall amount of irrelevant information being sent to the user.

In general, the gestures provide an input mechanism for human interfacing with a computer or a handheld device. Computers and handheld devices equipped with gesture recognition sensors provide the necessary hardware and software to recognize gesture input related to hand movements or vocal commands in varying degrees of complexity. Some recognition systems utilize planar two-dimensional (2D) or three-dimensional (3D) accelerometers embedded in handheld devices, which, in turn, communicate the human initiated data to their respective computing engines to provide data geared at offering integrated human input and location information requests for additional information.

Figure 4:
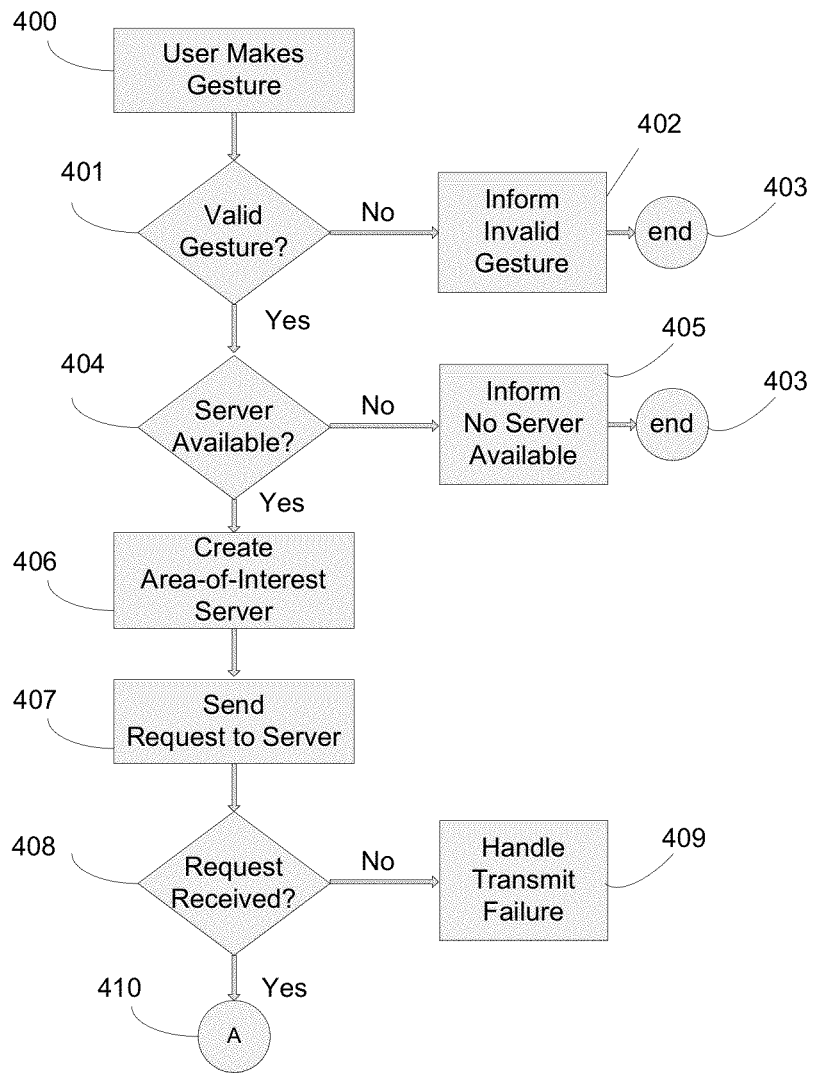
FIG. 4 illustrates a flow diagram according to the operations included in an example embodiment of the present inventive concept.

FIG. 4 illustrates an example flow diagram of the communications conducted between a user and a remote location information server, according to an example embodiment of the present inventive concept. Referring to FIG. 4, a user makes a gesture at operation 400, it is then determined by the user device or the server whether the gesture is a valid known type of gesture at operation 401. If not, the user is informed that gesture is not valid or there is no result from that invalid gesture at operation 403. If the gesture is valid the gesture information is forwarded to the gesture server provided the server is available at operation 404. If the server is not available, the user is informed or the process does not move forward at operation 405, and the process will end at 403.

If the server is available, the server proceeds to define the area-of-interest based on the information it receives and information which may be known to the server at operation 406. The server will receive a request sent for location information at operation 407 and if the request is properly received, the operations will continue to operation 410 denoted by "A", and the process will further be continued at FIG. 5. If the request is lost, operation 409 will create an error message to re-transmit the request.

Figure 5:
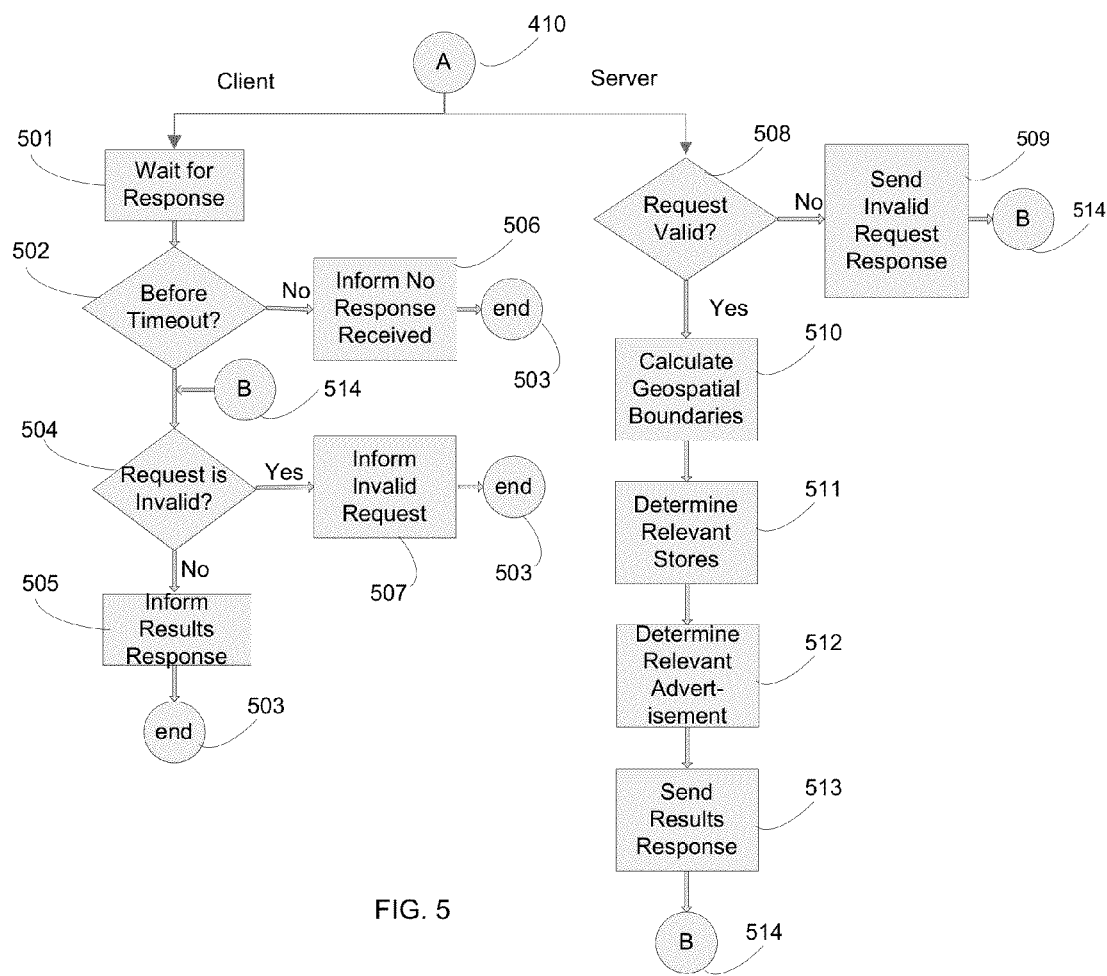
FIG. 5 illustrates another flow diagram that continues from FIG. 4 according to the operations included in an example embodiment of the present inventive concept.
Figure 2:
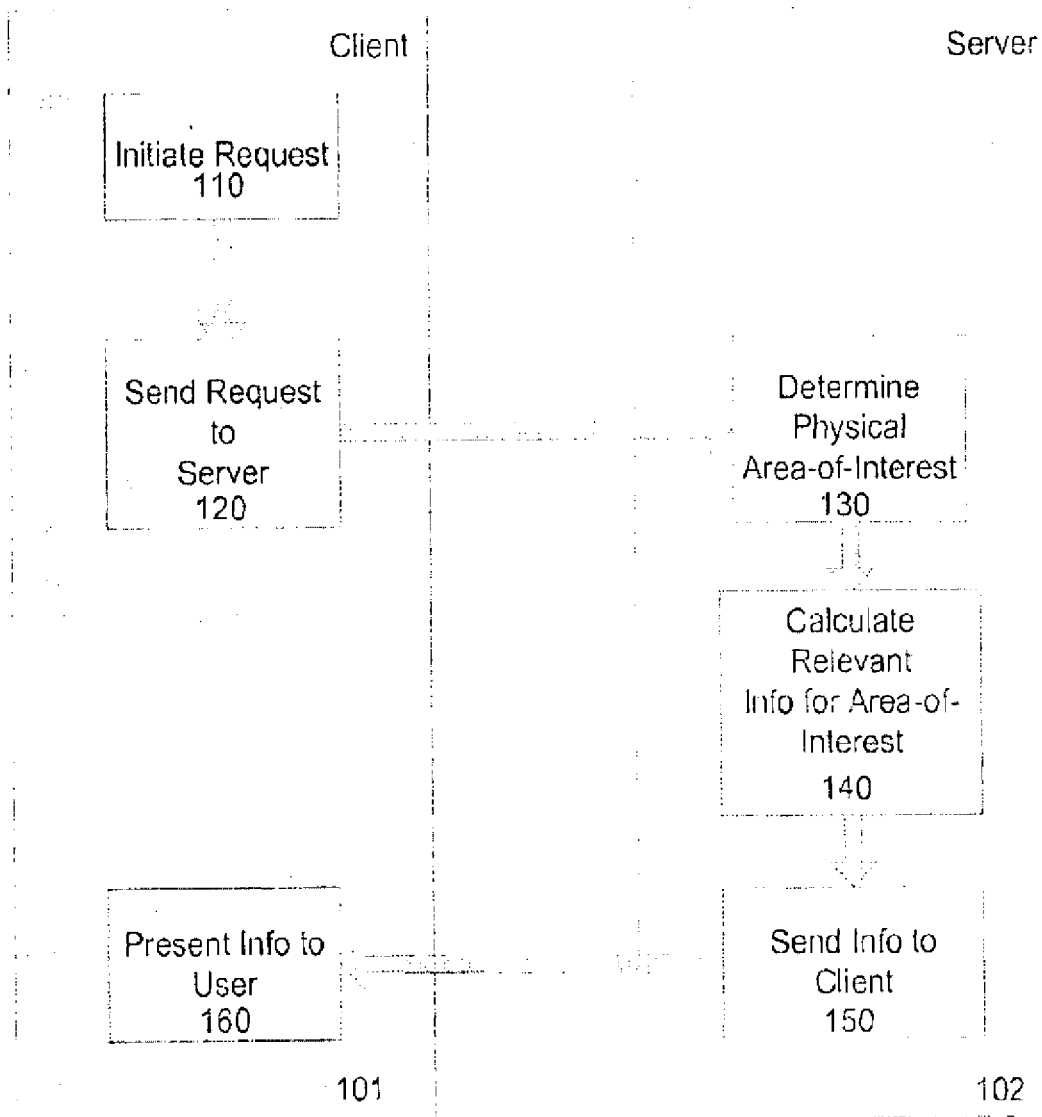
Figure 3:
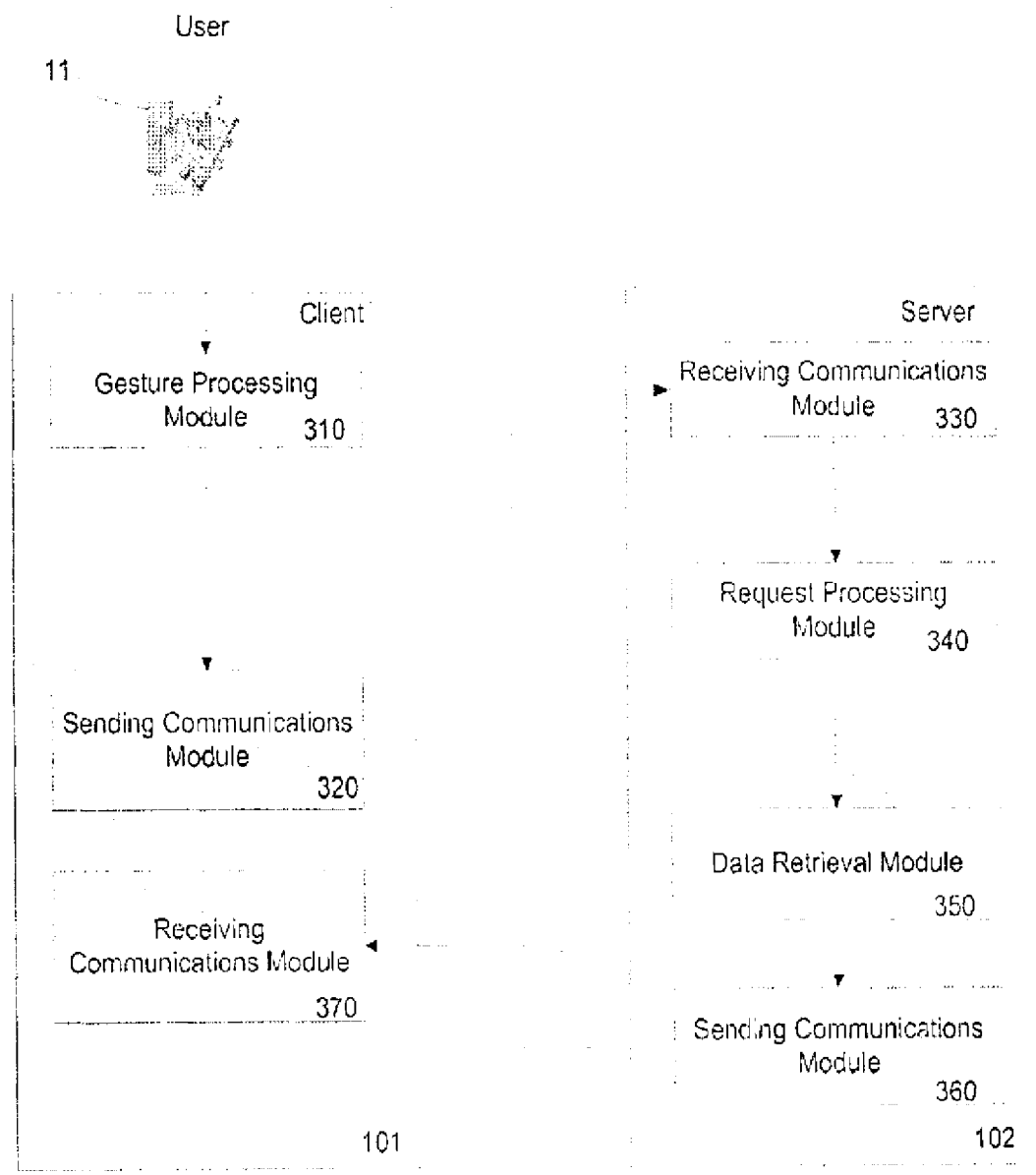
Figure 5:
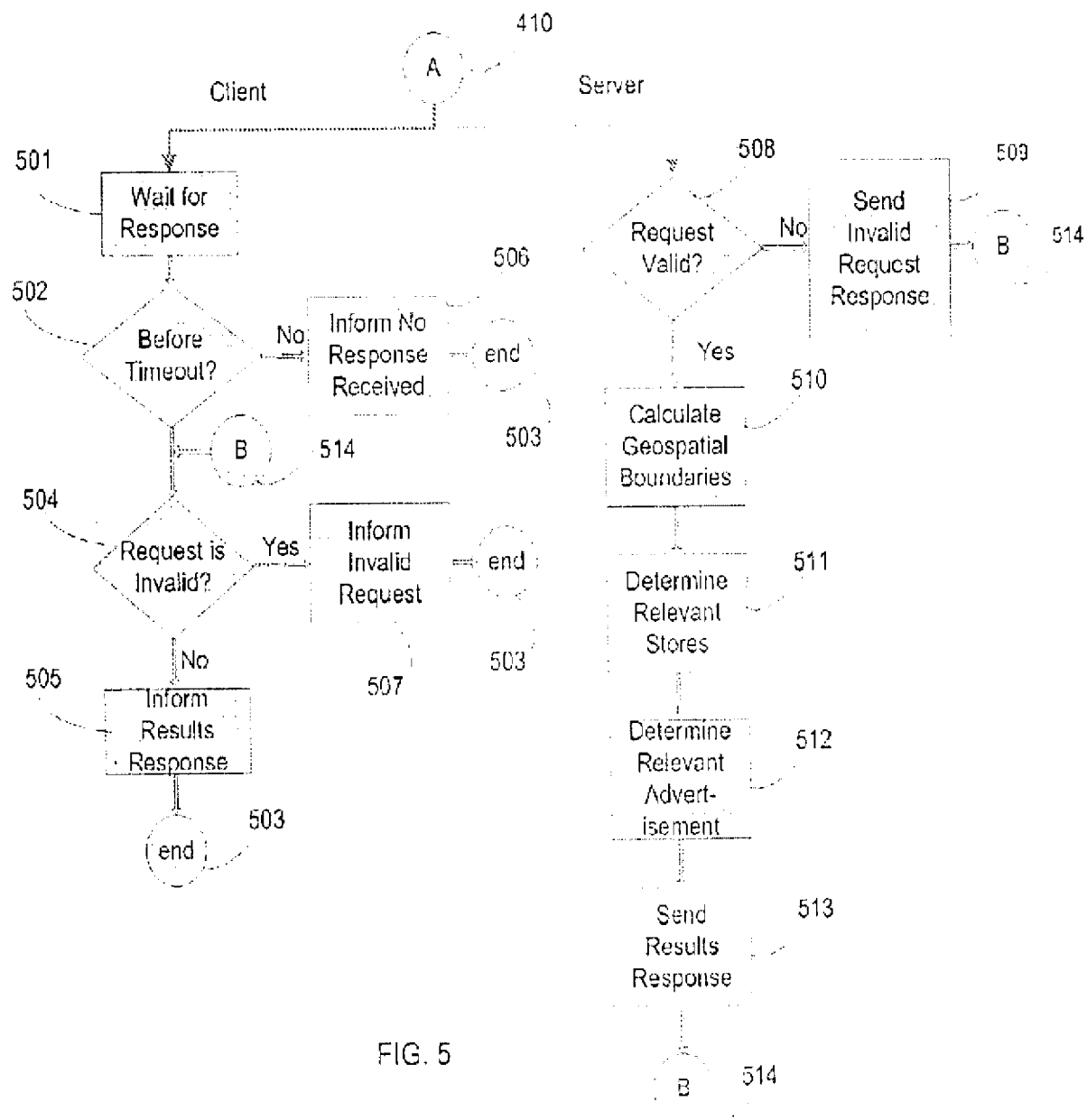

Referring to FIG. 5, further details of the location information processing between the client and server is disclosed. For instance, continuing at "A", now that the preliminary communications between the client and server have commenced. The additional client operations are illustrated on the left and the server operations are illustrated on the right. These operations may be conducted independently by the client and/or server, or, alternatively, may be conducted in parallel.

After receiving the area of interest request, the server validates the request at operation 508 from the client. Once the request is deemed valid, the server calculates at operation 510 the geospatial boundaries of the physical area that the user had indicated via the gesture input to determine the physical area-of-interest. If the request is not valid, an invalid request response will be generated and sent to the user at operation 509, and the process will end at "B" operation 514. Moving forward, the server will further determine the relevant stores included in the area-of-interest defined at operation 511. Based on the results of operation 511, the server will also determine the relevant advertisements at operation 512 by cross-referencing the relevant stores with advertisement information stored in a database. The server will then send the results to the user at operation 513 and will end at "B" in operation 514.

Referring to the left side of FIG. 5, while the server is validating and locating the area-of-interest and its related content, the client device is standing by and waiting for the response at operation 501. During this time period of waiting, the client device keeps checking for the server response while keeping track of time at operation 502. If a predefined timeout period expires, the client will be informed that no response was received at operation 506 and the process will end at 503.

On the other hand, if the response is received within the timeout period and the result of the server operations "B" is provided to the client, it is then determined whether the request is valid or invalid at operation 504. If the request is considered invalid the client is informed at operation 507, and the process ends at operation 503. If the request is deemed valid, the client is informed of the results at operation 505, and the process ends at operation 503.

The present inventive concept is preferably realized in a hardware device, such as, a computer, cellular phone, or other mobile terminal device etc. In other embodiments, the present invention may be realized in hardware, software, firmware or a combination of hardware, software and/or firmware.

The above example embodiments may also be implemented in software code and may be stored on a computer readable medium, such as, for example, non-volatile memory devices (e.g., RAM, ROM, hard disk etc.). The software code may be accessed from the computer readable medium and may be executed by a processor. The executed program may provide one or more of the features of the example embodiments.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

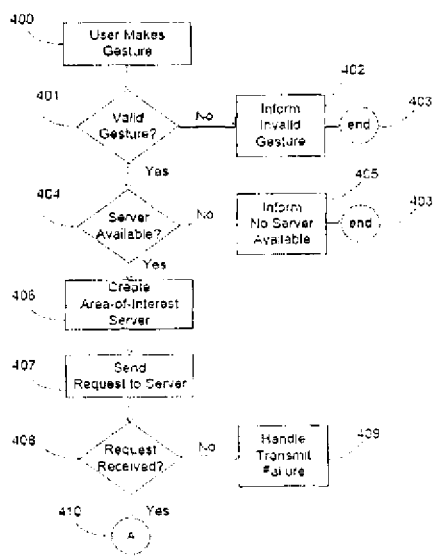

What is claimed is:

1. A method, comprising:
   receiving a gesture input at a mobile terminal;
   determining the gesture input as a valid known type gesture in defining a target area-of-interest;
   based on the determining, transmitting a request to receive location specific data to a server comprising:
      initial location data identifying a geographic location of the mobile terminal; and
      gesture data associated with the gesture input received by the mobile terminal; and
   receiving the location specific data corresponding to an area-of-interest from the server in response to the request;
   wherein the area-of-interest is based at least in part on the initial location data and predetermined user preferences corresponding to the gesture data; and
   wherein the gesture input comprises at least one of a voice command received by the mobile terminal, movement of the mobile terminal in a particular direction, selection associated with actuating a button or switch on the mobile terminal, a direction estimate from a compass component of the mobile terminal, or data received by the mobile terminal from a peripheral device.

2. The method of claim 1, wherein the location specific data comprises data identifying facilities located within the area-of-interest.

3. The method of claim 2, wherein the facilities comprise at least one of shopping facilities or service facilities.

4. The method of claim 1, wherein the location specific data comprises advertisements associated with facilities located within the area-of-interest.

5. The method of claim 1, wherein the initial location data comprises a GPS position estimate.

6. An apparatus, comprising:
   a receiving module configured to receive initial location data identifying an initial location of a mobile terminal and configured to receive gesture data captured by the mobile terminal;
   a processor configured to:
      determine the gesture data as a valid known type gesture in defining an area-of-interest;
      initiate a request to retrieve data relevant to the area-of-interest stored in a memory;
      calculate a geographical area-of-interest based at least in part on the initial location data and predetermined user preferences corresponding to the gesture data; and
      retrieve and modify location specific data associated with the area-of-interest; and
   a transmitting module configured to transmit the location specific data to the mobile terminal;
   wherein the gesture data comprises at least one of a voice command received by the mobile terminal, movement of the mobile terminal in a particular direction, selection associated with actuating a button or switch on the mobile terminal, a direction estimate from a compass component of the mobile terminal, or data received by the mobile terminal from a peripheral device.

7. The apparatus of claim 6, wherein the location specific data comprises data identifying facilities located within the area-of-interest.

8. The apparatus of claim 7, wherein the facilities comprise at least one of shopping facilities or service facilities.

9. The apparatus of claim 6, wherein the location specific data comprise advertisements associated with facilities located within the area-of-interest.

10. The apparatus of claim 6, wherein the initial location data comprises a GPS position estimate.

11. A non-transitory computer readable storage device including computer-executable instructions stored thereon that, when executed by a processing device, cause the processing device to perform operations comprising:
    receiving a gesture input at a mobile terminal;
    determining the gesture input as a valid known type gesture in defining an area-of-interest;
    based on the determining, transmitting a request to receive location specific data to a server comprising:
       initial location data identifying a geographic location of the mobile terminal; and
       gesture data associated with the gesture input received by the mobile terminal; and
    receiving the location specific data corresponding to the area-of-interest from the server in response to the request;
    wherein the area-of-interest is based at least in part on the initial location data and predetermined user preferences corresponding to the gesture data; and
    wherein the gesture input comprises at least one of a voice command received by the mobile terminal, movement of the mobile terminal in a particular direction, selection associated with actuating a button or switch on the mobile terminal, a direction estimate from a compass component of the mobile terminal, or data received by the mobile terminal from a peripheral device.

12. The non-transitory computer-readable storage device of claim 11 wherein the location specific data comprises data identifying facilities located within the area-of-interest.

13. The non-transitory computer-readable storage device of claim 12 wherein the facilities comprise at least one of shopping facilities or service facilities.

14. The non-transitory computer-readable storage device of claim 11 wherein the location specific data comprises advertisements associated with facilities located within the area-of-interest.

15. The non-transitory computer-readable storage device of claim 11 wherein the initial location data comprises a GPS position estimate.

16. A method, comprising:
- receiving, at a server, initial location data identifying an initial location of a device and gesture data identifying a gesture captured by the device;
- initiating a request for data relevant to an area-of-interest stored in a memory;
- determining the gesture data as a valid known type gesture in defining the area-of-interest;
- based on determining the gesture data, calculating an area-of-interest in response to the initial location data and predetermined user preferences corresponding to the gesture data;
- retrieving and modifying location specific data associated with the area-of-interest; and
- transmitting the modified location specific data to the device;
- wherein the gesture input comprises at least one of a voice command received by the mobile terminal, movement of the mobile terminal in a particular direction, selection associated with actuating a button or switch on the mobile terminal, a direction estimate from a compass component of the mobile terminal, or data received by the mobile terminal from a peripheral device.

17. The method of claim 16, wherein the location specific data comprises data identifying facilities located within the area-of-interest.

18. The method of claim 17, wherein the facilities comprise at least one of shopping facilities or service facilities.

19. The method of claim 16, wherein the location specific data comprise advertisements associated with facilities located within the area-of-interest.

20. The method of claim 16, wherein the initial location data comprises a GPS position estimate.

21. A device, comprising:
- a gesture processing module configured to receive a gesture input and configured to determine the gesture input as a valid known type gesture in defining an area-of-interest;
- based on the determining of the gesture input, a transmitter configured to transmit:
  - initial location data identifying a geographic location of the device;
  - gesture data associated with a gesture captured by the device; and
  - a request to receive location specific data; and
- a receiver configured to receive the location specific data related to an area-of-interest in response to the request;
- wherein the area-of-interest is determined in response to the initial location data and predetermined user preferences corresponding to the gesture data; and
- wherein the gesture input comprises at least one of a voice command received by the mobile terminal, movement of the mobile terminal in a particular direction, selection associated with actuating a button or switch on the mobile terminal, a direction estimate from a compass component of the mobile terminal, or data received by the mobile terminal from a peripheral device.

22. The device of claim 21, wherein the location specific data comprises at least one of data identifying shopping facilities or data identifying service facilities geographically located within the area-of-interest.

23. The device of claim 22, wherein the location specific data comprises advertisements associated with the shopping facilities or the service facilities.

24. The device of claim 21, wherein the initial location data comprises a GPS position estimate of the geographic location of the device.

* * * * *

UNITED STATES PATENT AND TRADEMARK OFFICE
CERTIFICATE OF CORRECTION

PATENT NO.       : 8,494,544 B2
APPLICATION NO.  : 12/629927
DATED            : July 23, 2013
INVENTOR(S)      : Patoskie et al.

It is certified that error appears in the above-identified patent and that said Letters Patent is hereby corrected as shown below:

Delete the title page and substitute therefore with the attached title page consisting of the corrected illustrative figure.

On Title Page 2, in Item (56), under "FOREIGN PATENT DOCUMENTS", in Column 1, Entry 4, delete "WO 2007/132055 11/2007".

In the Drawings

Delete Drawings Sheets 2, 3, and 5 and substitute therefore with the attached Drawing Sheets 2, 3, and 5. FIGS. 2, 3, and 5 are being corrected.

Signed and Sealed this
Ninth Day of December, 2014

Michelle K. Lee
*Deputy Director of the United States Patent and Trademark Office*

(12) United States Patent
Patoskie et al.

(10) Patent No.: US 8,494,544 B2
(45) Date of Patent: Jul. 23, 2013

(54) METHOD, APPARATUS AND COMPUTER PROGRAM TO PERFORM LOCATION SPECIFIC INFORMATION RETRIEVAL USING A GESTURE-CONTROLLED HANDHELD MOBILE DEVICE

(75) Inventors: John Patoskie, Allen, TX (US); Mark Gerard, Plano, TX (US); Thomas Wheeler, Frisco, TX (US)

(73) Assignee: Oscad Remote Limited Liability Company, Wilmington, DE (US)

(*) Notice: Subject to any disclaimer, the term of this patent is extended or adjusted under 35 U.S.C. 154(b) by 586 days.

(21) Appl. No.: 12/629,927

(22) Filed: Dec. 3, 2009

(65) Prior Publication Data
US 2011/0136511 A1 Jun. 9, 2011

(51) Int. Cl.
*H04W 72/00* (2009.01)

(52) U.S. Cl.
USPC ......... 455/453; 455/566; 455/563; 455/414.1

(58) Field of Classification Search
USPC ............ 455/453, 566, 563, 414.1; 345/419, 345/173; 715/707, 726
See application file for complete search history.

(56) References Cited

U.S. PATENT DOCUMENTS

| | | | |
|---|---|---|---|
| 4,214,485 A | 7/1980 | Berger et al. |
| 5,128,655 A | 7/1992 | Shore |
| 5,602,566 A | 2/1997 | Motosyuku |
| 5,797,105 A | 8/1998 | Nakaya et al. |
| 6,025,830 A | 2/2000 | Cohen |
| 6,112,141 A | 8/2000 | Briffe et al. |
| 6,201,844 B1 | 3/2001 | Ezaki |
| 6,201,554 B1 | 3/2001 | Lands |
| 6,282,713 B1 | 6/2001 | DeVito et al. |
| 6,304,733 B1 | 10/2001 | Nagasaki |
| 6,347,299 B1 | 2/2002 | Bartlett |
| 6,357,939 B1 | 3/2002 | Baron |
| 6,369,794 B1 | 4/2002 | Sakurai et al. |
| 6,375,572 B1 | 4/2002 | Masuyama |

(Continued)

FOREIGN PATENT DOCUMENTS

| | | |
|---|---|---|
| JP | 9081305 | 3/1997 |
| WO | 1995/07526 | 3/1995 |

(Continued)

OTHER PUBLICATIONS

Analog Devices: Analog Devices Introduces the World's Smallest and Least Expensive Micromachined Tilt-Motion Sensor. PR Newswire, Jan. 12, 2000.

(Continued)

*Primary Examiner* — Manpreet Matharu
(74) *Attorney, Agent, or Firm* — Stolowitz Ford Cowger LLP

(57) ABSTRACT

A method and apparatus are disclosed that calculate an area-of-interest based on a user request for location specific data. The operations may include transmitting initial location data of the mobile terminal and user initiated gesture data to a server. The server may then perform initiating a request to receive the requested location data, and calculating a geographical area-of-interest based on the initial location data and the user initiated gesture data. The location specific data related to the area-of-interest may then be retrieved and transmitted to the mobile terminal. The area-of-interest may be defined based on the initial position of the mobile terminal and information provided by a gesture made by the user of the mobile terminal.

24 Claims, 5 Drawing Sheets